July 19, 1955 K. S. DUNLAP 2,713,617

REPETITIVE TELEPHONE CALLING SYSTEM EMPLOYING POWER SUPPLIED OVER THE SUBSCRIBER'S LOOP

Filed July 10, 1952 5 Sheets-Sheet 1

INVENTOR
K. S. DUNLAP
BY J W Schmied
ATTORNEY

July 19, 1955 K. S. DUNLAP 2,713,617

REPETITIVE TELEPHONE CALLING SYSTEM EMPLOYING POWER SUPPLIED OVER THE SUBSCRIBER'S LOOP

Filed July 10, 1952 5 Sheets-Sheet 2

INVENTOR
K. S. DUNLAP
BY
J W Schmied
ATTORNEY

INVENTOR
K. S. DUNLAP
BY J. W. Schmied
ATTORNEY

July 19, 1955 K. S. DUNLAP 2,713,617

REPETITIVE TELEPHONE CALLING SYSTEM EMPLOYING POWER SUPPLIED OVER THE SUBSCRIBER'S LOOP

Filed July 10, 1952 5 Sheets-Sheet 4

INVENTOR
K. S. DUNLAP

BY J. W. Schmied
ATTORNEY

GENERATION OF START PULSES

GENERATION OF PULSES REPRESENTING DIGIT 1

GENERATION OF PULSES REPRESENTING DIGIT 2

GENERATION OF PULSES REPRESENTING DIGIT 0

THE START PULSES AND PULSES REPRESENTING THE DIGIT 2 AS APPLIED TO THE LINE DURING ONE CYCLE OF THE EXCITATION CURRENT

INVENTOR
K. S. DUNLAP
BY J. W. Schmied
ATTORNEY

United States Patent Office 2,713,617

Patented July 19, 1955

2,713,617

REPETITIVE TELEPHONE CALLING SYSTEM EMPLOYING POWER SUPPLIED OVER THE SUBSCRIBER'S LOOP

Kermit S. Dunlap, Madison, N. J., assignor to Bell Telephone Laboratories, Incorporated, New York, N. Y., a corporation of New York Application July 10, 1952, Serial No. 298,166

9 Claims. (Cl. 179—81)

The present invention relates to an improved telephone subscriber's station apparatus and more particularly to improved calling and supervisory equipment in such apparatus.

In accordance with an exemplary embodiment of the present invention supervisory equipment at the subscriber's station is arranged to cooperate with the calling equipment preset in accordance with the entire number to be called before the call is initiated. The calling equipment operates at a high speed after the call is initiated and transmits identifying signals repeatedly until the signal transmitting equipment is stopped by the supervisory equipment under control of the central office. The telephone subscriber's set has transmission equipment and signaling equipment which are individually associated with the transmission line through sets of contacts. The contacts are jointly controlled mechanically at the subset and magnetically from the central office. The transmitting and signaling equipment are not both connected to the transmission line at the same time and thus interference therebetween is prevented. Such interference takes the form of losses to speech currents, losses to signal currents and false operation of signal current equipment at the receiver at the central office due to speech currents.

As in previous systems of the type set forth in a Patent No. 2,499,606 to D. B. Parkinson, issued March 7, 1950, each digital position of the called subscriber's designation is representated by pulses wherein the identity or magnitude of the respective digit is determined by the time elapsing between the two pulses. As set forth in the above-identified patent to Parkinson, a plurality of impulse coils are employed at the subset or subscriber's station to generate the pulses transmitted to the central office under control of an alternating-current wave received from the central office. A manual selecting device is additionally provided at the subscriber's station to permit the subscriber to select the character of symbols of digits of the various digital positions of the called subscriber's identification.

In systems of the prior art as shown in the above-identified patent it is desirable to transmit the signaling currents at high speed and without the successive acts or operations of the calling subscriber. In order to accomplish this feature automatically operable apparatus is provided at the subscriber's station which requires electrical power for its energization. In accordance with the exemplary embodiment of the present invention, as well as in the arrangements shown in the prior art, alternating-current power has been found the most suitable for actuating and energizing this equipment at the subscriber's station. The frequency of this power is relatively low, as for example of the order of commercial power frequencies. The most economical manner of supplying this power to outlying subscribers' stations is over the same conductors as form the subscriber's line. The conductors are therefore employed for transmitting both the signaling currents and supervisory currents as well as the voice frequency or telephone communication currents.

In the systems set forth in the prior art as in the above-identified patent the low frequency power current is transmitted to the subscriber's station over a simplex circuit of the subscribers' lines. In other words, the low frequency power is connected at the central station between both line conductors and ground and then the power actuating equipment at the subscriber's station is likewise interconnected with both line conductors and ground.

Though such an arrangement operates satisfactorily for most regions in the country, in certain regions either direct current or alternating current or both direct-current and alternating-current earth potentials of appreciable magnitude exist. In these regions the earth potentials interfere with the satisfactory operation of the improved signaling and supervisory arrangements of the prior art as described in the above-identified patent.

In accordance with the present invention the above difficulties are overcome by transmitting all three different types of currents, namely, signaling currents, supervisory currents and low frequency power currents for actuating the subscriber's station equipment, without interference one with another, between the two line conductors extending between the central office and the subscriber's station. The ground connection at the subscriber's station is eliminated which prevents the earth potential effects from interfering with the operation of any of the circuits.

It is then an object of the present invention to provide a telephone subscriber's station which will cooperate with high speed signaling systems of the type disclosed and referred to in the above-identified patent which is capable of operating in regions which experience disturbing earth potentials by rearranging the subscriber's station equipment so that no connection is required between the line conductors and ground at the subscriber's station to permit currents flowing between the line conductors and ground at the subscriber's station.

Another object of the present invention is to provide a telephone subscriber's station equipment which will cooperate with a high speed improved telephone switching system wherein the supervisory currents, the signaling currents and low frequency power currents are all transmitted between the subscriber's line conductors so that no ground connection is required at the subscriber's station.

Another object of the present invention is to provide improved switching and supervisory equipment at a subscriber's station which is jointly controlled by the subscriber and from the central office solely over the two conductors of the subscriber's line without disturbances or interferences due to ground potentials existing between the subscriber's station and the central exchange.

Still another object of the present invention is to provide improved supervisory and switching equipment located at the subscriber's station and controlled by the central office for maintaining the calling equipment associated with the line extending to the central office in response to initiation of each call by the subscriber and for disassociating the calling equipment from the line after sufficient pulses have been transmitted to the most remote switching office to extend a path to the called subscriber's line.

Still another object of the present invention is the provision of improved supervisory equipment which automatically connects the telephone transmitter and receiver to the line extending to the central office in response to each call received over the line.

Still another object of the present invention is to provide improved supervisory and switching equipment located at the subscriber's station for associating the calling equipment in the subscriber's station with the line extending through the central office and disassociating the communication equipment from the line extending to the central office in response to the initiation of each call by the subscriber.

Still another object of the present invention is the provision of an improved two-step switching device in which a first step is controlled by a subscriber initiating the call and in which the second step is initiated or controlled from the central office. Both steps occur simultaneously when the subscriber answers the call.

Still another object of the present invention is the provision of improved supervisory and switching equipment which avoids distortion of the wave shape of applied alternating current.

The foregoing and other objects and features of this invention may be more readily understood from the following detailed description of an exemplary embodiment thereof when read with reference to the attached drawings wherein.

Figure 11:
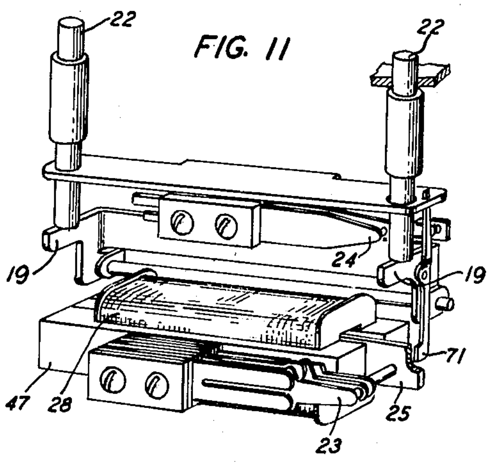

Fig. 11 shows the supervisory and switching control equipment which is manually operated but released under control of the office equipment; and Figs. 12, 12A, 12B, 12C, 12D, and 12E illustrate typical wave forms of the applied alternating current or fluxes produced thereby and typical wave forms of pulses generated by the equipment made in accordance with this invention and located at the subscriber's station.

Figure 1:
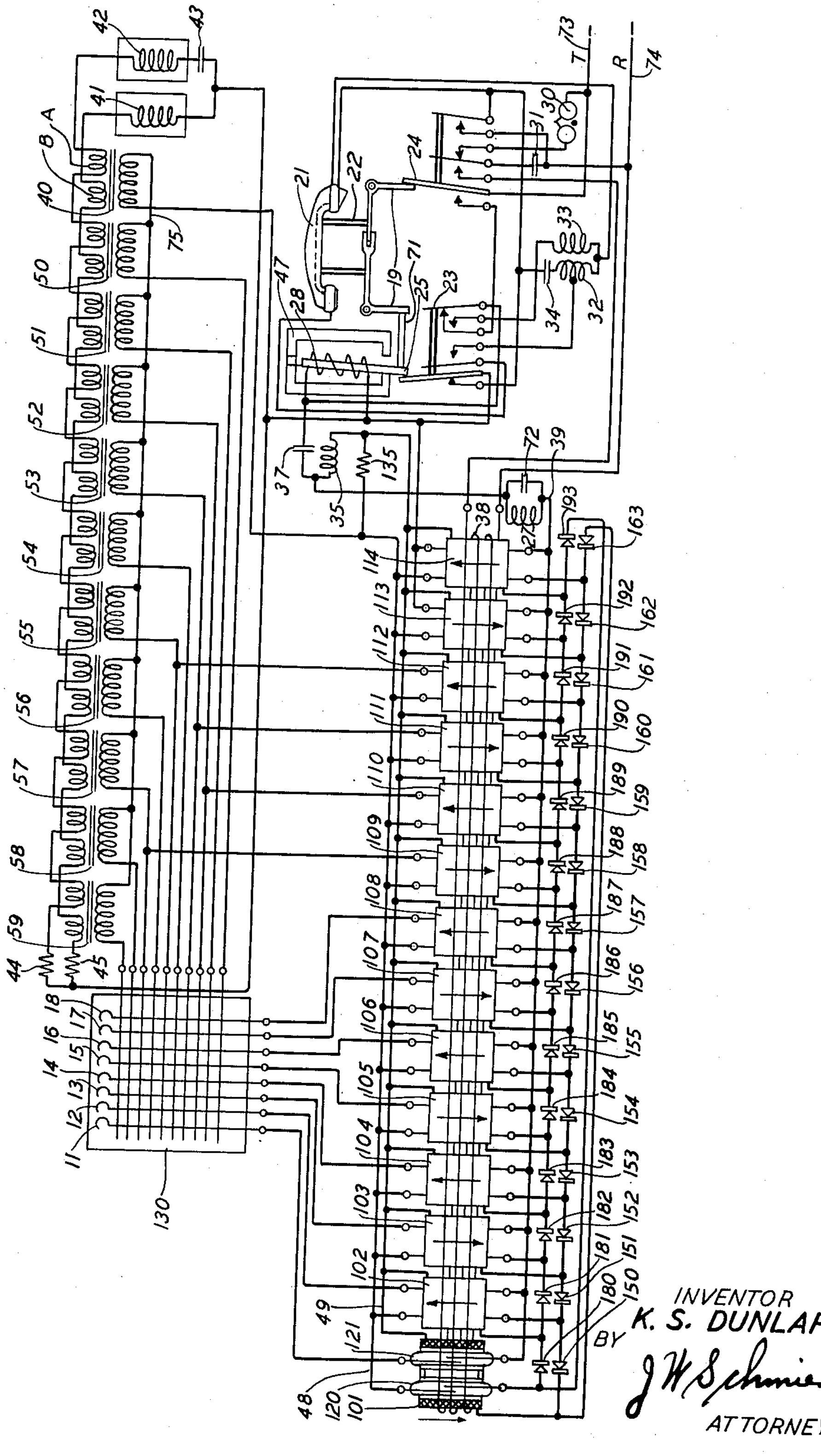
Fig. 1 is a detailed circuit diagram of the various devices in the subscriber's station of the present invention.
Figure 2:
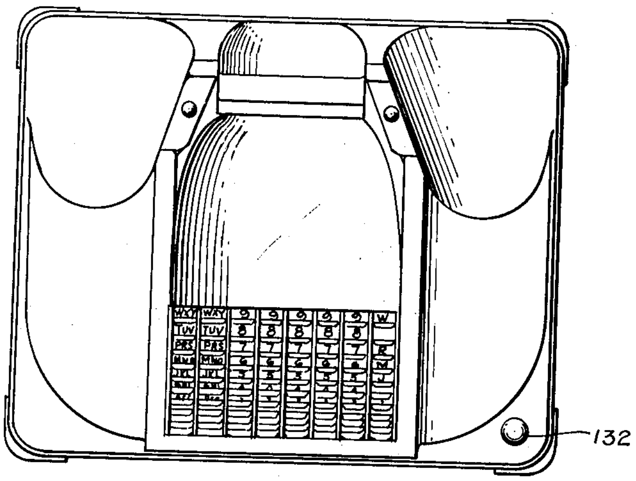
Fig. 2 is a top view of the subscriber's station equipment of the present invention.
Figure 3:
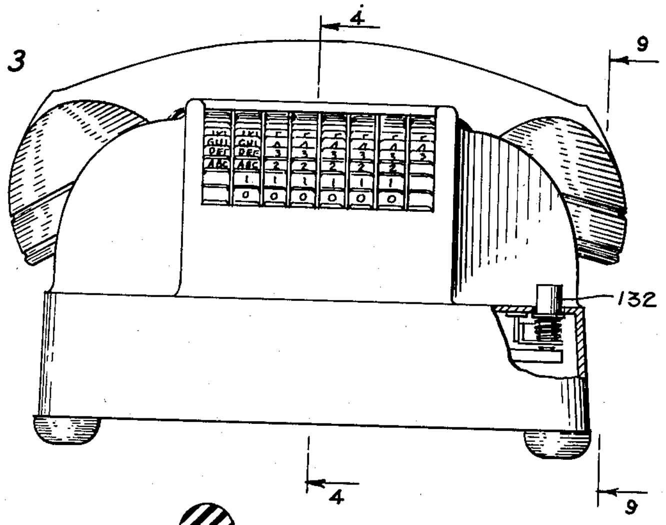
Fig. 3 is a front elevation of the subscriber's station equipment of the present invention.
Figure 4:
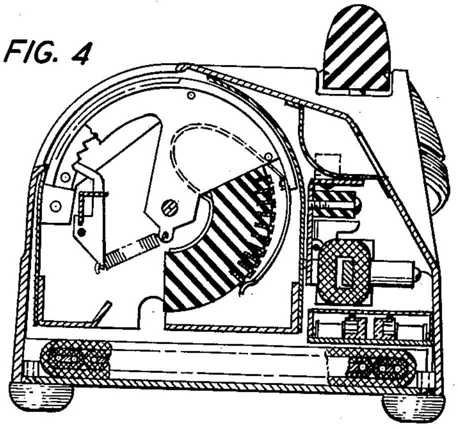
Fig. 4 is a partial section through said equipment at the position indicated by the section line 4—4 of Fig. 3.

Referring now to Fig. 1 which shows the over-all schematic of the subscriber's station equipment, the subscriber's station equipment includes a handset 21. The handset 21 when resting upon the support or cradle depresses the pins 22 and causes the bell cranks 19 to actuate contacts 24 to the right and contacts 23 to the left, both as shown. Contacts 24 are controlled solely by the position of the handset 21 while the contacts 23 are controlled jointly by the handset through the pin 22 and bell crank 19 and also by a magnetic locking or holding device 47. Placing the receiver 21 on the hook or the handset on the cradle will restore both sets of contacts 23 and 24 to their normal or idle condition. The set of contacts 24 are moved to their off-normal position in response to the initiation of a call by the subscriber removing the handset or receiver 21 from its supporting member. The second set of contacts 23, however, are maintained in their normal or idle condition by the magnetic holding or locking device 47. After all signals necessary to select the called subscriber's line have been transmitted to the final switching center employed in establishing the call, the magnetic holding device 47 is actuated or moved to its opposite position whereupon the second set of contacts 23 move to their off-normal position and disassociate the calling equipment from the subscriber's line and associate telephone transmitting and receiving equipment with the line. The connection of the transmitting and receiving equipment conditions the subscriber's set for telephone communication.

A group of saturable magnetic impulse coils 40 and 50 through 59 are provided for generating a start pulse and ten stop pulses to represent each possible identity or character of each of the digits of the called subscriber's number. The secondary windings of the coils 40 and 50 through 59 are connected to a manually controlled switching or dialing arrangement 130 permitting the subscriber to select the designation or number of the called subscriber's station. The manual switching or selector device 130 is, in turn, connected to a plurality of electromagnetic reed-type relays 101 through 114 of the type disclosed in United States Patents 2,245,391 granted to E. Dickten, Jr., June 10, 1941 and 2,264,022 granted to W. B. Ellwood, November 25, 1941. These relays are arranged to successively close their contacts (as will be shown), and thus provide a distributor arrangement for transmitting the pulses representing the identity of the various digits of the called subscriber's number in succession. A group of rectifiers or unilateral conducting devices, 150 through 163, inclusive, and 180 through 193, inclusive, are provided to control the relays 101 through 114 of the distributor as will be hereinafter described.

Although any suitable source of alternating current may be employed to actuate the equipment at the subscriber's station, in the specific embodiment described herein the alternating-current power for actuating the subscriber's station apparatus is supplied to the subset equipment over the subscriber's line 73 and 74 from a source at a remote point which remote point is usually the central office. In addition, phase-splitting networks comprising inductors 41, 42 and capacitor 43 are provided for applying alternating currents in quadrature to the two sets of primary windings of the impulse generating coils 40 and 50 through 59, inclusive. Isolating and phasing networks comprising inductors 35 and 27 and capacitors 37 and 72 are provided as is hereinafter described to isolate the circuits of the distributor comprising relays 101 through 110 and the impulse generating coils 40 and 50 through 59, inclusive. These networks suppress transients due to the operation of the distributor relays 101 through 114 and thus prevents these transients from interfering with the operation of the impulse coils 40 and 50 through 59 or with the operation of the receiving equipment at the central office. In addition, these networks are employed to properly phase the controlling currents supplied to the distributor relays and the impulse coils.

In the exemplary embodiment shown, provision is made for the generation of pulses representing eight different digital positions, or characters, representing the called subscriber's station during each complete cycle of operation of the calling apparatus and these pulses are repeatedly generated as long as the excitation current is applied. In addition, in the specific embodiment set forth herein pulses representing four additional digits are transmitted during each cycle of operation of the calling apparatus which may be employed to identify the calling station for charging purposes or for other reasons. When these extra digits are not required they may be omitted. Pulses representing any arbitrarily chosen number of digital positions or characters (within reasonable limits) may be generated by properly designed signaling apparatus. Eight digital or character positions have been selected for this disclosure for representing the called subscriber's station since eight character calling numbers are in common use in telephone systems. It will be understood that these characters may be digits or letters or a combination of the two as commonly used in designating telephone calls. Each of the digits 0 to 9 will be represented by a different combination of two pulses with the pulse combination representing the digit 2 also representing the letters A, B and C and the pulse combination representing the digit 3 also representing the letters D, E and F, and so on. Hereinafter, each combination of a eight characters will be referred to as a called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3 milliseconds are required for the longest transients to die out sufficiently so that the succeeding pulse may be accurately recognized without interference from the transient caused by the previous pulse. In other words, each transmitted pulse of approximately 1 millisecond duration is in effect lengthened to a decaying alternating current of approximately 3 milliseconds duration. At the end of this 3-millisecond period or any time thereafter a second pulse may be transmitted.

Figure 12:
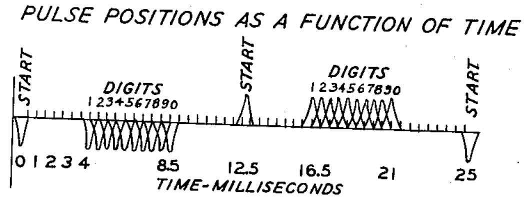

The signaling system employed in this embodiment of the invention utilizes a start pulse of 1 millisecond duration for each character, which is generated at about 11-millisecond intervals as long as the pulsing transformers 40 and 50 through 59 are energized, and a stop pulse of 1 millisecond duration for each character, which reaches its peak value during the 3.5 to 7.44-millisecond interval of time after the start pulse has reached its peak value. In order to provide sufficient margins of safety to permit reliable signaling, over 3.5 milliseconds are allowed for the decay of each pulse as shown in Fig. 12 and the times of the start of transmission assigned to stop pulses representing digits of successive magnitudes differ by .444 millisecond. Thus, digit 1 is represented by a start pulse followed by a stop pulse which reaches its peak value about 3.5 milliseconds after the start pulse reaches its peak value, digit 2 is represented by a start pulse followed by a stop pulse which reaches its peak value about 3.94 milliseconds after the start pulse reaches its peak value, and so on. It will be observed that the stop pulse for the digit 0 reaches its peak value 7.49 milliseconds after its start pulse and 3.5 milliseconds before the next succeeding start pulse. Thus, there is required an increment of 3.5 milliseconds for the decay of the start pulse, nine increments of .444 millisecond each for the generation of a pulse at any one of the ten times necessary to represent the various digits, and a last increment of 3.5 milliseconds, all of the latter being required to permit a stop pulse to decay only if it should occur at the end of the ninth increment of time. Consequently, about 11 milliseconds elapse between the start pulses of succeeding digits, from which it follows that 11 milliseconds is required in this exemplary system to transmit each digit or character designating the called number.

In order to indicate the starting point of the transmission of a called number, a time interval of approximately 22 milliseconds during which no pulses are transmitted is provided at the beginning of or between groups of pulses representing a called number. Thus, a time interval of 111 milliseconds is required to transmit each eight-digit called number and the corresponding no-signal or blank period. When the subset is arranged to transmit extra digits to identify the calling or called station the time of the cycle of the calling apparatus is correspondingly extended.

In accordance with this exemplary embodiment of the invention the signaling pulses are generated by saturation-type pulse generating transformers 40 and 50 through 59. There are eleven pulsing transformers 40 and 50 through 59, one for each of the numerals 0 to 9 and one for the start or reference pulse. The excitation current for the apparatus may be obtained locally at the subscriber's station or, as in the exemplary embodiment set forth herein, the excitation current is transmitted from the central office over the lines 73 and 74 which interconnect the signaling station with the central office. This current is an alternating current of substantially sinusoidal wave form with changes in shape being highly detrimental to successful operation as is hereinafter described. It is an important feature of the present invention to maintain the alternating current in a substantial sinusoidal wave shape as the timing of the various pulses is partially dependent thereon. At the signaling station the current is passed through a phase-shifting network comprising the components 41, 42 and 43 so that the current is converted to a two-phase source in which the two currents are 90 degrees out of phase.

Each of the pulse generating transformers 40 and 50 through 59 has a single secondary winding and two primary windings. The corresponding primary windings of the transformers 40 and 50 through 59 are serially interconnected and connected with the two phases of the excitation current so that one phase of the excitation current is applied to one primary winding of each transformer and the other phase of the excitation current is applied to the other primary winding of each transformer. The secondary windings of the transformers 40 and 50 through 59 are connected across the lines 73 and 74 through a selector switch 130 and a distributor as is hereinafter described.

The magnetic core of each transformer 40 and 50 through 59 is designed to be saturated except for very small values of ampere-turns, and an electric pulse is generated in the secondary winding of each transformer 40 and 50 through 59 when the flux is changed from saturation at one polarity to saturation at the other polarity. The flux generated in the core of each transformer 40 and 50 through 59 depends upon the number of turns in the two primary windings of the transformer and upon the current flowing in each winding. In this embodiment of the invention the maximum value of the currents in the circuits associated with each phase are equal. Thus, the flux generated in the core of each transformer with two primary windings depends upon the number of turns in the primary windings of the transformer and upon the time-phase relationship between the currents flowing in the primary windings. The pulse attains a maximum value when the flux becomes zero.

For this signaling system it is necessary that all pulses be substantially alike as to wave form and amplitude and that each combination of two pulses representing a digit be of the same polarity. The area under a voltage-time curve representing the pulse is proportional to the total change in flux and to the number of turns in the secondary winding. High intensity energization will produce a high, short pulse, while lower energization will produce a wider pulse having the same area. Thus, if all pulses are to be alike the total maximum ampere-turns on each core must be equal. Assuming equal maxima in the currents of the two phases and a 90-degree phase displacement, then for pulses of equal amplitude and shape the turns $N_A$ and $N_B$ of the two primary windings of each of the transformers must be such that $$\sqrt{N_{A_1}^2+N_{B_1}^2}=\sqrt{N_{A_2}^2+N_{B_2}^2}= \ldots = \text{a constant}$$

where $N_{A_1}$, $N_{A_2}$, etc., are the number of turns in the primary winding of the transformers which is connected to phase A of the excitation current and $N_{B_1}$, $N_{B_2}$, etc., are the number of turns in the other primary winding of the same transformers which is connected to phase B of the excitation current. If these conditions are met and if the cores and secondary windings of all the transformers are alike the pulses will be suitable for signaling purposes.

In order to cause each transformer 40 and 50 through 59 to generate a pulse at a suitable time during each half cycle of the excitation current, the total ampere-turns driving flux through the transformer cores must be controlled so that the flux in each transformer is zero at the time assigned to the pulse which that transformer serves to generate. This means that $$N_A I_A - N_B I_B = 0$$

must be satisfied at the time the pulse is a maximum, where $N_A$ and $N_B$ are as defined above and $I_A$ and $I_B$ are the currents through $N_A$ and $N_B$, respectively. If each phase of the excitation current is of sinusoidal wave form and both phases of equal maximum amplitude, then the timing is determined by the turns ratio as follows:

$$I_A = I_0 \cos \omega t$$

$$I_B = I_0 \sin \omega t$$

and substitution gives $$N_A I_0 \sin \omega t - N_B I_0 \cos \omega t = 0$$

or $$\frac{N_B}{N_A} = \tan \omega t$$

where $I_A$, $I_B$, $N_A$ and $N_B$ are as defined above, $I_0$ is the maximum current supplied by each phase of the excitation current, $\omega$ equals the frequency in cycles per second multiplied by $2\pi$, and $t$ is the time in seconds.

Thus, when the angular position of the desired pulse is fixed in relation to each half cycle of the excitation current, the number of turns and the polarity of the winding are given by these equations. The necessity of maintaining the sinusoidal wave shape of the applied alternating current is therefore evident.

Since the magnetic flux in each transformer is reduced to zero two times during each cycle of the excitation current it follows that a combination of two pulses representing a digit must occur during each half cycle of the excitation current and that each combination of two pulses representing a digit are of opposite polarity to the preceding two pulses.

Pulsing transformers 40 and 50 through 59, inclusive, are interconnected so that the A windings of the transformers are connected in series and connected to the excitation current through phase-shifting network 41 and so that the B windings of the transformers are connected in series and connected to the excitation current through phase-shifting networks 42 and 43. The phase-shifting networks are of conventional design and serve to apply an alternating current to the A windings of the transformers which is displaced 90 degrees in time-phase relationship from the alternating current applied to the B windings of the transformers.

Figure 12A:
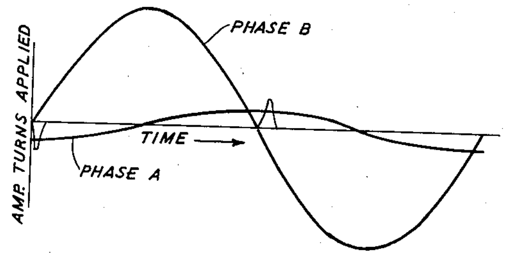

As described above, each of the transformers 40 and 50 through 59, inclusive, is designed so that its core is saturated except for very small values of flux. Thus, a short pulse is generated in the secondary winding of each transformer when the flux in the core of that transformer passes through zero magnitude. These pulses are illustrated in Fig. 12 which shows the various pulse positions as a function of time. Fig. 12A indicates the ampere-turns applied to the core of transformer 40 as a function of time and shows the time-phase relationship between the start pulses and the ampere-turns applied to this transformer.

Figure 12B:
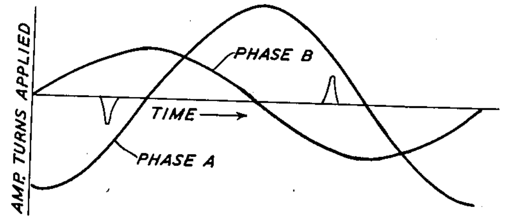
Figure 12C:
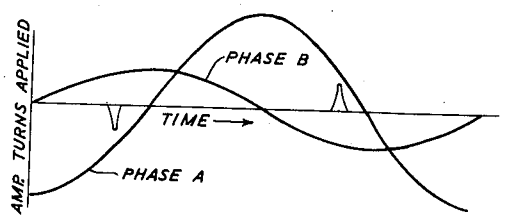
Figure 12D:
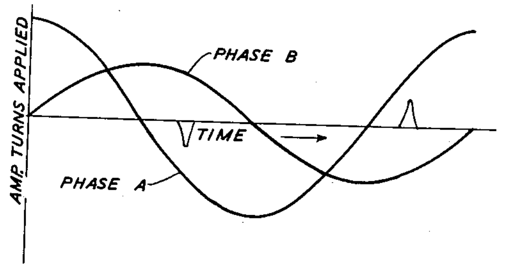

Since transformers 40 and 50 through 59, inclusive, are connected to both phases of the excitation current, the ampere-turns generated in each transformer will equal the summation of the ampere-turns generated by each phase winding. As described above, the maximum value of the current in each phase is equal and the time-phase relationship between the two alternating currents is fixed. The time therefore at which the summation of the ampere-turns and consequently the flux in each transformer passes through zero magnitude is governed by the number of turns in each phase winding. Fig. 12B indicates the ampere-turns generated in each phase winding of transformer 51 as a function of time and shows the time-phase relationship between the stop pulses representing the digit 1 and the ampere-turns generated in each phase winding. Figs. 12C and 12D indicate the time-phase relationships for the generation of stop pulses representing the digits 2 and 0, respectively. In each case the stop or digit pulse voltage is induced in the output winding when the summation of the ampere-turns in both input windings equals zero, in each case two pulses, i. e., a start pulse and a stop pulse are induced during each complete half cycle of the applied alternating current and in each case each successive pulse is of opposite polarity to the preceding pulse as induced by the same transformer. It will be apparent that the particular phase relationships indicated are arbitrary and that other relationships would serve equally well.

Referring now again to Fig. 1, the parallel circuitry of capacitor 72 and inductor 27 is connected through the capacitor 37, contacts 23 and 24 to the line 73. The capacitor 72 and inductor 27 are proportioned to the iterative impedance of the line and to the impedances of the secondary windings of coils 40 and 50 through 59, inclusive, so that each half-cycle pulse as generated by a transformer is applied through the capacitor 72 and inductor 27 to the line as a complete cycle of alternating current of sinusoidal wave form, and the period of each complete cycle of alternating current is equal to the time required for each half-cycle pulse as generated by the transformers 40 and 50 through 59. An additional function of the parallel circuitry of inductor 27 and capacitor 72 is to prevent the 45 cycle current from flowing through the secondary windings of the pulse transformers 40 and 50 through 59. Capacitor 72 and inductor 27 are antiresonant at the applied alternating-current frequency of 45 cycles so that the path through the selected secondary winding of the transformers 40 and 50 through 59 does not act as shunt to the driving 45 cycle current. Capacitor 37 and inductor 35 are series resonant at the applied alternating-current frequency so that current flows through the distributor windings, phase splitting network 42 and 41 and the transformer primaries.

Figure 12E:
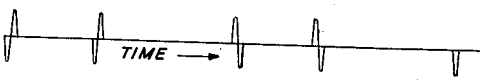

Fig. 12E indicates the start pulses and pulses representing the digit 2 as applied to the line during one cycle of the excitation current. Fig. 12E in conjunction with Figs. 12A and 12C indicates the relationship between the pulses as generated in the transformers and the pulses as applied to the line. An excitation current which alternates at 45 cycles per second is employed for this embodiment of the invention. However, it will be apparent that other frequencies would serve equally well.

The primary windings of each of the transformers 40 and 50 through 59 are proportioned so that each transformer generates a stop pulse corresponding to the digit assigned to that transformer. Thus, each of these transformers 40 and 50 through 59 generates a pulse which reaches its peak value at a time during the 4½-millisecond interval assigned to stop or digit pulses and there is a ½ millisecond time interval between the peak values of each pulse generated.

During the time that the excitation current is applied to the primaries of pulsing transformers 40 and 50 through 59 a pulse is generated in each secondary during each half cycle of the excitation current. In order to apply the pulses to the line comprising conductors 73 and 74 in conformity with the called number which it is desired to transmit, selector switch 130 and the distributor are employed to interconnect the transformers 40 and 50 through 59 with the lines 73 and 74. Pulses representing any of the digits 0 to 9 may be impressed across the telephone line in accordance with the setting of the selector switch 130.

Figure 5:
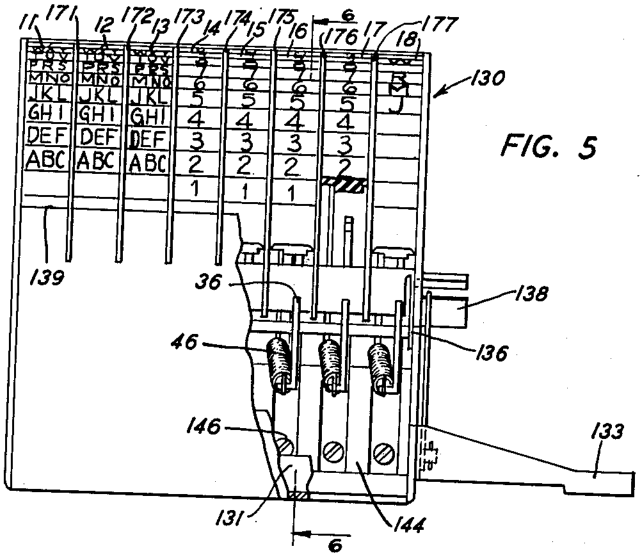
Fig. 5 is a partial sectional view of the manual selecting devices employed in the subscriber's station of the present invention.
Figure 6:
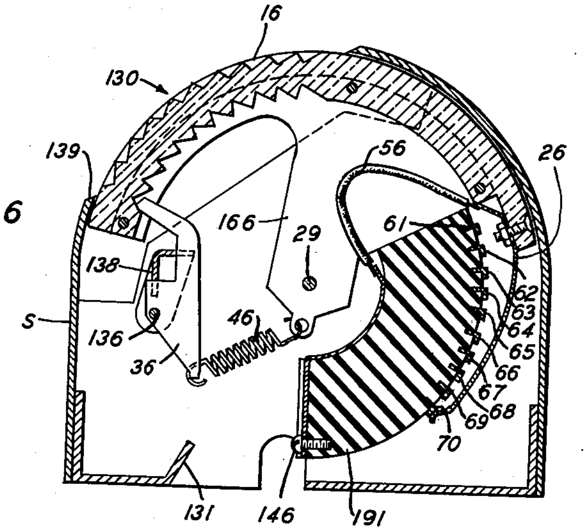
Fig. 6 is a partial section view along the broken line 6—6 of Fig. 5.
Figure 7:
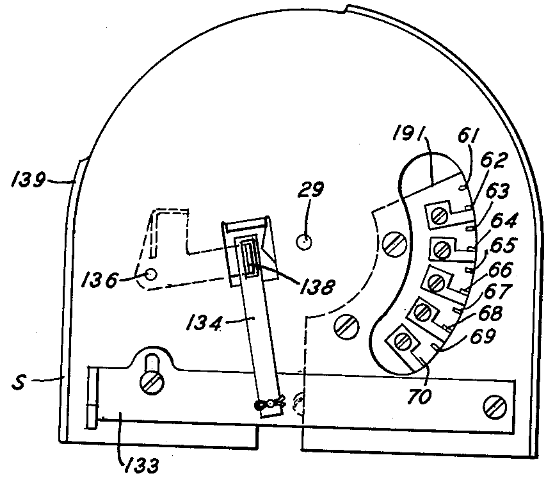
Fig. 7 shows the right-hand end view of the finger-operated setting device shown in Fig. 5.
Figure 8:
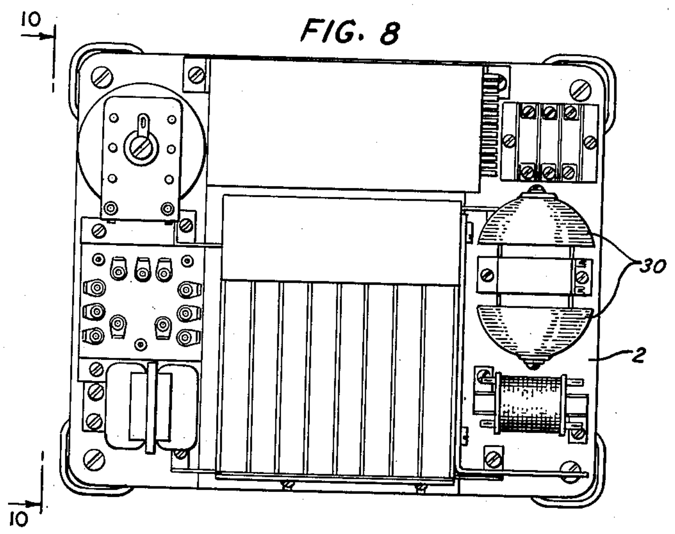
Fig. 8 is a bottom view of the subscriber's station equipment of the present invention.
Figure 9:
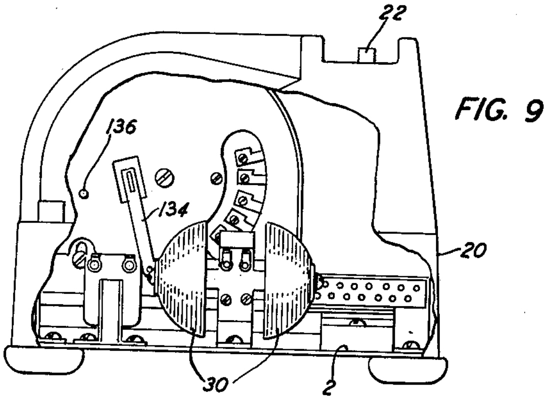
Fig. 9 shows a partially broken away view of the subscriber's station equipment, along the broken line 9—9 of Fig. 3.
Figure 10:
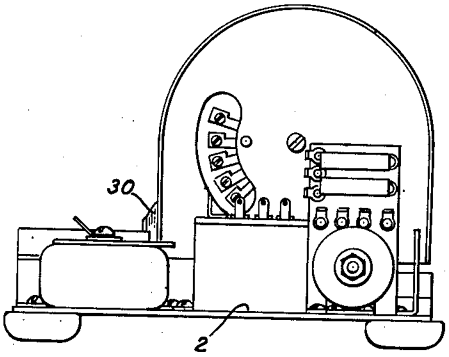
Fig. 10 shows a right-hand elevation of the equipment shown in Fig. 8 along the section line 10—10.

Figs. 5, 6 and 7 indicate one embodiment of the selector switch 130. The switch 130 is enclosed in case S where selector dials 11 to 18 and release lever 133 are accessible to an operator. The selector dials 11 through 18 are made of a non-conducting material such as hard rubber or plastic, and are each provided with ten indentations along the outer periphery. Each identation is designated by a letter or number conforming to the telephone signaling system, and each is of suitable configuration to permit an operator's finger to engage and move the respective dials 11 through 18. The selector dials 11 through 18 are separated by spacers 171 to 177 which are attached to case S. As indicated in Fig. 6, each dial 11 through 18 is attached to an individual support 166 so that each dial may be moved approximately one-fourth of a revolution about shaft 29. The inner surface of each dial 11 through 18 is provided with ten grooves which correspond to the finger indentations on the outer periphery of the dial. The grooves on each dial 11 through 18 serve to engage with a detent pawl 36 to secure each dial in one of the ten possible positions as selected by the operator. As indicated in Fig. 6, detent pawl 36 which cooperates with dial 16 is pivoted about shaft 136. Spring 46 is attached between support 166 and pawl 36 so that pawl 36 is normally forced against dial 16, thereby securing the dial 16 in a fixed position by engaging with one of the ten grooves. Spring 36 also serves to apply a continuous force to support 166 which tends to rotate support 166 and dial 16 in a clockwise direction about shaft 29. The grooves on the dials 11 through 18 and the detent pawls 36 are shaped and positioned so that by pressing upon the finger indentations in a dial an operator can move the dial in either direction, the ratchet action of the pawl 36 against the grooves securing the dial in any one of the ten positions to which it may be moved. The rotary movement of the dials 11 through 18 is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls 36 are disengaged from the dials 11 through 18, thereby permitting the spring 46 associated with a dial, to cause the dial to return to its initial position.

A spring contact is connected to each dial, and each dial and spring contact may be moved so that the spring contacts may be connected with any one of ten conductors. As indicated in Fig. 6, spring contact 26 is attached to dial 16 and it is electrically connected to terminal 146 through conductor 56. Insulator 191 supports the various terminals and conductors, and the ten conductors 61 to 70 which may be contacted by spring contacts mounted thereon.

The distributor arrangement as shown in Fig. 1 comprises fourteen relays, 101 to 114, of the type disclosed in the above-identified patents to Ellwood and Dickten and each of the relays 101 through 114 in the specific embodiment set forth herein comprises an individual coil surrounding two normally open reed relay contacts. These reeds are made of magnetic material and sealed in a container which may be of glass or other suitable material. The reeds are polarized by means of one or more permanent magnets so that reeds normally remain open. However, when a current of one polarity within the operating range flows in the winding the contacts will not close but when a current of the same or smaller magnitude of the opposite polarity flows through the winding surrounding these contacts the contacts will close. When the current through the winding is then reduced to zero, the contacts remain closed until current of a predetermined substantial magnitude flows in the reverse direction through the windings at which time the contacts open and remain open until the current again flows through the winding in the operating direction. In addition, a common winding 38 is provided for all of the relays 101 to 114 and surrounds all of the reeds and their associated polarizing magnets in such a manner that when a current of sufficient magnitude is passed through the winding 38 the reeds of a predetermined one of the relays will be actuated in the opposite manner to that which the reeds of all the other relays are actuated. This behavior may be accomplished by reversing the sense of polarity of the polarizing magnet and of the operating winding of the one relay from the sense of the polarity of the polarizing magnet and operating winding of all the other relays.

It is to be noted that the right-hand reed in each of the relays 101 through 114 is employed to interconnect successive ones of the digit selectors 11 through 18 of the selector switch 130 with the common conductor 39, whereas the left-hand reeds are employed to control the operation of other relays 101 through 114 of the distributor.

Assume now that the relays are positioned with the reed contacts in relay 109 closed while the reed contacts of all the other relays 101 through 108 and 110 through 114 are open. Further assume that controlling frequency for controlling the reeds is applied between conductors 48 and 49. If the alternating current between the conductors 48 and 49 is in such a direction that the upper conductor 48 is negative with respect to 49 at the time the contacts of the relay 109 are closed then a path is completed by the closure of the left-hand contacts of the relay 109 from conductors 48 through the left-hand contacts of relay 109, rectifier 187, winding of relay 108 to conductor 49. Current flows in the above path in such a direction as to maintain the reed contacts of relay 108 open. This is indicated diagrammatically by the arrow shown within the relay 108 which indicates the direction in which the current must flow between the windings of the relay 108 to cause its contacts to close. When the current flows in the opposite direction the relay 108 will open its contacts as described above. When the alternating current changes polarity so that the upper conducetor 48 becomes positive and the lower conductor 49 becomes negative then current ceases to flow through the winding of relay 108 and flows from the upper conductor 48 through the left-hand reed of relay 109 and through the rectifier 188 at this time and through the winding of relay 110 in such a direction as to close its contacts. Upon closure of the left-hand contacts of relay 110, current also flows from the upper conductor 48 through the lefthand contacts of relay 110 through rectifier 158 and the winding of relay 109 to the lower conductor 49. This current flows in such a direction as to open contacts of the relay 109 and interrupt the current flowing through the winding of relay 110. The contacts of relay 110 however remain closed at this time so that current continues to flow through the winding of relay 109 in such a direction as to maintain the contacts of this relay open. When the upper conductor 48 again becomes negative, current flowing through the left-hand contacts of relay 110 reverses and flows through the winding of relay 111 and rectifier 159 instead of through the winding of relay 109 and rectifier 158. The direction of flow of current through this winding is such as to cause the reed contacts of the relay 111 to close and complete a circuit through the lefthand contacts of relay 111 and rectifier 189 through the winding of relay 110 in the reverse direction thus causing the relay 110 to release. In this manner the contacts of each of the relays 101 through 114 are closed for one-half cycle of the alternating current between conductors 48 and 49.

Furthermore, upon each reversal of the voltage between these conductors 48 and 49 the reed contacts of the succeeding relays are closed and the reed contacts of the previous relays are opened. Consequently, the contacts of the reeds close in succession, each one remaining closed for approximately one-half cycle of the applied controlling alternating current.

The manner in which the various devices and circuits cooperate with each other to form a subscriber's subset capable of cooperating with a switching system to provide improved service will now be described. The circuits as shown in Fig. 1 are in their normal or idle condition. At this time the ringer 30 is connected in series with capacitor 31 across the tip and ring conductors 73 and 74, extending to the central office. At the central office, battery is normally connected to one of these conductors and ground to the other conductor thus placing a charge upon the capacitor 31.

If the subscriber is called, ringing current will be applied to the conductors 73 and 74 at the central office and cause the ringer 30 to ring. When the subscriber picks up the handset 21 the pins 22 rise. As shown in Figs. 1 and 11, the pins 22 in rising cause the bell cranks 19 to rotate. As a result, the contacts 24 close and the member 71, Fig. 11, is rotated in a counter-clockwise direction away from the armature 25 of the magnetic lock or relay 47. The polarity of the voltage applied to the tip and ring conductors 73 and 74 at the central office is in such a direction at this time as to move the armature 25 to the right as viewed in Fig. 1 and also in Fig. 11 with the result that the contacts 23 are also switched to their opposite or right-hand position.

With both contacts 23 and 24 actuated to their operated positions, the signaling equipment at the subscriber's station comprising the impulse coils 40 and 50 through 59, the selector switch 130 and the distributor relays 101 through 114, inclusive, are disconnected from line conductors 73 and 74. The transmission apparatus and circuits including the transmitter and receiver of the handset 21, windings 32 and 33 of the induction coil and capacitor 34 are connected to the tip and ring conductors 73 and 74 extending to the central office, which completes the transmission circuit and supplies necessary battery to the transmitter of the handset 21.

The circuits then remain in this condition as long as the subscribers are talking over the established circuits. It should be noted that throughout this time a direct-current path exists between the conductors 73 and 74 extending from conductor 73 through the left-hand operated set of contacts 24, the right-hand operated set of contacts 23, induction coil 33, the transmitter of the handset 21 and the right-hand set of operated contacts of the group of contacts 24 to conductor 74 extending to the central office. Variations in the transmitter resistance produced by the voice waves are thus transmitted in the above-described circuit to the central office. In addition, they induce currents in the secondary winding 32 of the induction coil which currents flow in a circuit which extends from the common connection between the transmitter and receiver through the left-hand winding 32 of the induction coil, through the central set of operated contacts of a group of contacts 23, and through the receiver and back to the common points between the receiver and transmitter.

Voice currents arriving over conductors 73 and 74 transmitted over the above-described circuit, including the winding 33 of induction coil and the transmitter of the handset induce currents in the left-hand winding 32 connection to the receiver in the manner described above. The capacitor 34 is connected between the upper terminal of winding 32 and the transmitter to increase the transmission efficiency of the handset in the usual manner.

At the termination of the call, the subscriber will replace the handset 21 upon the cradle or supporting members and cause pins 22 to be depressed. As a result, the group of contacts designated 24 will be actuated to the right as shown in Fig. 1, while the contacts 23 will be actuated to the left. In addition, the armature 25 of the switching relay 47 is also actuated to the left. At this time the direct-current path between conductors 73 and 74 is interrupted and the ringer 30 and condenser 31 are reconnected between the tip and ring and the normal battery potential applied to the conductors at the central office thus restoring the charge on capacitor 31 to its normal value.

When a subscriber at the substation described herein in detail desires to make a call, he will first ascertain the number or designation of the subscriber with whom he wishes to communicate. The subscriber will then set the selector switch 130 of Fig. 1, which is also shown in Figs. 2, 3, 4, 5, 6, 7, 9 and 10, by placing his finger over the desired letter or numeral for each digit in the ratchet wheels 11 to 18 and then moving these wheels downward to the guide or stop member, which may form a part of the front of the case of the subset as indicated at 139 in Figs. 3, 4, 5, 6 and 7.

After the subscriber has moved each one of these dials or wheels 11 through 18 in this manner, he may check the setting of the instruments to be sure that it is set in accordance with the designation of the desired subscriber's station. At this time this designation appears in the first line above the stop or guide member 139.

If the subscriber has made an error in setting these selector discs, he may correct the error in either of two ways: (1) He may adjust the setting of the individual discs 11 through 18 that are not set as he desires, or (2) he may release them all by operation of button 132 shown in Figs. 2 and 3 which depresses the lever 133, shown in Figs. 5, and 7, which lever then moves the link member 134 downward and rotates the latch control plate 138 in a clockwise direction and is viewed in Figs. 6 and 7. The member 138 then engages the pawls or latches 36 associated with each of the selector discs 11 through 18 and rotates these latches 36 in a clockwise direction, thus disengaging these pawls or latches 36 from the notches on the inside of the discs 11 through 18 as shown in Fig. 6 and permitting the discs 11 through 18 to be restored to their original or zero position. The subscriber may thereafter set them in accordance with the designation of the desired subscriber's station.

After the subscriber has set the discs 11 through 18 and checked the accuracy of the setting, he is ready to place a call. It should be noted that in setting each disc 11 through 18, a brush 26 carried or supported by each of the discs passes over a group of ten contact bars 61 to 70 and makes contact with one of these bars depending upon the position in which the disc is set by the subscriber. Such contact arrangement is represented graphically by the selector member 130 in Fig. 1 wherein the brushes attached to the discs are designated 11 through 18. These brushes are moved in engagement with the horizontal bars or conductors as shown in Fig. 1 and represented by the bars 61 through 70 in Figs. 6 and 7.

After having set the discs 11 through 18, the subscriber will then pick up the handset 21 which allows the pins 22 to rise. The bell crank 19 rotates and permits both groups of contacts 23 and 24 to be actuated to their operated positions. Contacts 24 do so move and are actuated to their left-hand position as shown in Fig. 1 but the armature 25 of the relay or magnetic holding device 47 maintains the set of contacts 23 in their normal or operated position due to residual magnetic attraction between the armature and the left-hand pole-piece.

The contacts 24 being operated to their left-hand position connect the capacitor 31 across the terminals of the common winding 38 surrounding all of the reeds of the reed relays 101 through 114. The capacitor 31 discharges in this circuit and in discharging closes the reed contacts of one of the relays and opens the reed contacts of all of the other relays which may be closed. Assume, for example, the contacts of 110 are closed and the contacts of all of the other relays are opened. As described hereinabove, the permanent magnet associated with the reeds of relay 110 will then maintain these contacts closed until opened by the reversed magnetic field due to a reverse current flowing through its winding.

Contacts 24 in moving to their left-hand position also connect conductor 73 through the left-hand operated contacts 24 and right-hand normal contacts 23 to the upper terminal of winding 28, and connect conductor 74 through the right-hand operated contacts 24 and the left-hand normal set of contacts 23 to the lower winding terminal of winding 28. The winding of relay 28 therefore provides a direct-current path between conductors 73 and 74.

A circuit also extends from conductor 74 through the right-hand operated contacts 24 and the left-hand normal contacts 23 to the left-hand terminal of the secondary winding of the impulse coil 40. This circuit may be also traced through this winding of coil 40 to the common conductor 75 extending to a terminal of a secondary winding of each of the saturable pulse coils 50 through 59. The circuit will later extend through various ones of these coils and the selector switch 130 to the right-hand set of reed contacts of the respective relays 101 through 108 or to the corresponding contacts of relays 109 through 112, independent of the selector switch 130. The circuits then extend from the contacts of relays 101 through 112 to common conductor 39 and then through capacitor 72 and inductor 27, the capacitor 37, the right-hand break contacts of contacts 23, the left-hand operated contacts 24 to conductor 73 extending to the central office.

The connection of the winding 28 between conductors 73 and 74 extending to the central office, as described above, causes current to flow from the central office over the conductors 73 and 74 through a relay or other responsive device in the central office and also through the winding 28. The polarity of current flowing through the winding 28 at this time is such that it maintains armature 25 in its left-hand position as shown in Fig. 1.

The equipment at the central office responds to the current flowing over conductors 73 and 74 and through the winding 28 causing the line at the central office to be connected to a receiving and registering circuit. Upon connection of the line to this circuit at the central office, the central office equipment will be conditioned to respond to the calling signals transmitted from the subscriber's station. In addition, the equipment at the central office does not interrupt the supply of direct current to the conductors 73 and 74 thus maintaining supervision thereby and also applies alternating current between the conductors 73 and 74. The armature of relay 25, however, still remains in the position shown due to the effect of the direct current and the residual magnetic induction of the permanent magnets employed in this device. The alternating current applied to the conductors 73 and 74 at the central office flows through the winding 28 but does not produce any appreciable magnetic effect upon the magnetic locking device 47 due to the presence of the direct current and the residual magnetism. A closed loop is thus established from the alternating-current source at the central office, the line 73, the contacts 24 and 23, the coil 28, the contacts 23 and 24 to the line 74 and back to the alternating-current source. No appreciable magnetic effect is produced in the locking device 47 as the coil 28 presents a very high impedance to the alternating current. Alternating current through the lines 73 and 74 also flows to the network comprising elements 35, 135 and 37. This network is provided to suppress switching transients which may arise due to the operation of the distributor relays and thus prevents these transients from adversely affecting the operation of the pulse coils 40 and 50 through 59. The suppression of these transients also prevents said transients from interfering with the operation of the equipment at the central exchange. This network also controls the magnitude and phase of the alternating voltage between conductors 48 and 49 so that a voltage sufficient to operate the relays at the required time and speed is provided across these conductors, which voltage has a phase such that the distributor relays advance on each half cycle before the pulses from coil 40 are generated during each half cycle. Alternating current flows from line conductor 73 to the upper terminal of coil 28, and then through capacitor 37, inductor 35, conductor 49 through the winding of relay 109, rectifier or unilateral conducting device 158 and left-hand reed contacts of relay 110 to conductor 48, assuming that the first half cycle of the alternating current applied to conductors 73 and 74 is of the negative polarity. From conductor 48, the alternating current flows through the phase-shift networks comprising inductors 41 and 42 and condenser 43 and then through the two sets of primary windings of the saturable impulse coils 40 and 50 through 59, inclusive. Thereafter the alternating currents flow through the resistors 44 and 45 back to the lower terminal of the coil 28 and line conductor 74. As described above, the two phase-shifting networks 41 and 42 and condenser 43 cause the alternating currents flowing through the two primary windings of the impulse coils 40 and 50 through 59 to be displaced substantially 90 degrees in phase. Also as described above, during each half cycle of this alternating current, a pulse is generated in output or secondary windings of each of these impulse coils 40 and 50 through 59 at different times in the manner described above. The pulses are first generated in the secondary or output windings of the start coil 40 and thereafter in the output windings of each of the successive saturable magnetic coils 50 through 59, inclusive. Such a pulse is generated by each of the coils 50 through 59 for each half cycle of the applied alternating current. Thus, if the first half cycle is substantially complete, such a pulse is generated by each of these coils. However, in the usual case, the phase of this pulse, and frequently the pulses generated for the next two or three half cycles, will not be accurate so that these pulses usually are not employed at the central office because the circuits thereat will not have had time to become properly conditioned to receive them. Furthermore there may be some transient currents which will interfere with the proper generation of these pulses at this time so that these first pulses are generally ignored. However, when the alternating current reverses, after the first half cycle which, as assumed above is negative, or if the first half cycle applied to the line 73 is positive then current flows from the conductor 73 and through the winding 28, capacitor 37, inductor 35, to conductor 49 and then through the winding of relay 111, rectifier 159, left-hand operated reed contacts of relay 110 to conductor 48, and then through the phase-shift networks 41 and 42 and the impulse coils 40 and 50 through 59 back to the line 74. The direction of current flow through the winding of relay 111 causes its reed contacts to close and in closing, the left-hand reed contacts complete a circuit from conductor 49 through the winding of relay 110, rectifier or unilateral conducting device 189 to conductor 48, through the left-hand operated reed contacts of relay 111 and then back to line 74 in the manner described above. The direction of flow of current through the winding of relay 110 at this time is in such a direction as to cause its contacts to open. Thereafter the contacts of the relay 110 remain open until the relay 110 is again actuated. During this half cycle the pulses will be generated by each of the impulse coils as described above.

During the next succeeding half cycle of the alternating current, a circuit is completed from conductor 49 through the winding of relay 112 and unilateral conducting device 190 to conductor 48 through the left-hand operated reed contacts of relay 111 and then back to line 74 as described above. Current flows through the winding of relay 112 in such a direction as to close its contacts. When the contacts of relay 112 close, a circuit is completed through the winding of relay 111 from conductor 49 through the rectifier 160 and closed left-hand contacts of relay 112 to conductor 48 and thus to line 74. The direction of the flow of current at this time through relay 111 is in the reverse direction and causes this relay to open its contacts.

During each of these half cycles, certain of the impulse coils are connected to the transmission circuit as will be described hereinafter. However, as pointed out above, the equipment at the central office is designed to employ these first few pulses for conditioning the equipment to accurately respond to the succeeding pulses.

Under the assumed conditions, at the beginning of the next half cycle the contacts of relay 113 will close and cause the contacts of relay 112 to open. The closure of the right-hand contacts of relay 113 connects a circuit which extends from conductor 74 through the right-hand operated contacts 24, through the left-hand break contacts 23 and the operated right-hand contacts of relay 113 to conductor 39, and then through capacitor 72, inductor 27, capacitor 37, and through the right-hand break contacts 23 and left-hand operated contacts 24 to conductor 73. The circuit in effect short-circuits the line through the capacitor 72, inductor 27, capacitor 37, and the operated contacts 113 so that the output of the impulse coils is in effect disconnected or short-circuited at this time. Consequently, no pulses will be transmitted over lines 73 and 74 even though such pulses are generated during this half cycle by the various coils 40 and 50 through 59, inclusive. In a similar manner at the beginning of the next half cycle of the alternating current, the contacts of relay 114 close and the contacts of relay 113 open. During this half cycle, the right-hand contacts of relay 114 similarly short-circuit or connect the conductors 73 and 74 together through capacitor 72, inductor 27 and capacitor 37 and prevent the transmission of pulses to the central office.

These two half cycles during which no pulses are transmitted constitute a blank interval and are recognized at the central office as indicating the termination of pulses representing a subscriber's designation and that pulses representing the succeeding transmission or repetition of the designation is about to be started. The central office circuits respond to the blank interval by conditioning the received circuits so that they will respond to the next succeeding pulses and record these signals if they are properly received as described in an application, Serial No. 298,036, by W. A. Malthaner and H. E. Vaughan, filed on the same date herewith.

During the next half cycle of the applied alternating current, contacts of relay 101 are closed and the contacts of relay 114 are opened. At this time the brush 11 of the selector switch 130 has been positioned in contact with one of the conductor bars 61 through 70 as shown in Figs. 6 and 7. Assume for a purpose of illustration that it has been moved to engage the No. 2 or third conductor bar from the bottom of Fig. 1 as shown by the dotted half circle in Fig. 6. In other words, the brush arm 26 attached to the first selector disc engages the conductor 68 as shown in Figs. 6 and 7 indicating that the first letter designation of the called subscriber's station is an A, B or C. Assume, for example, that it is a C. During this half cycle, the right-hand contacts 121 of relay 101 are closed and connect the brush arm 11 to the common conductor 39. Consequently, when the start pulse coil 40 generates a pulse, this pulse is transmitted over the following path to conductors 73 and 74 to the central office: from conductor 73 through the left-hand operated contacts 24, the right-hand break contacts 23, capacitor 37, capacitor 72 and inductor 27, common conductor 39, right-hand contacts 121 of relay 101, brush arm 11, the No. 2 horizontal conductor of the selector switch 130, the secondary winding of the impulse coil 52 and the secondary winding of the start pulse coil 40 and through the left-hand break contacts 23 and the right-hand operated contacts 24 to conductor 74.

It is noted that the winding 28 of the polarized relay or locking device 47 is also shunted across these conductors as described above. However, the winding 28 offers high impedance to the pulses transmitted to the central office and thus does not materially interfere with the transmission of these pulses.

A short time later during the same half cycle and in the position indicated in Fig. 12E for the No. 2 or C character of the digit or symbol of the called subscriber's number, a pulse is generated in the secondary winding of the impulse coil 52, which pulse is likewise transmitted over the conductors 73 and 74 to the central office over the same circuits described above with reference to the start pulse generated in the secondary winding of coil 40. These two pulses as explained above, identify the character of the first digit or symbol of the called subscriber's number. The capacitor 37, capacitor 72 and inductor 27 together with the secondary winding of coil 52 for the start pulse, and together with the secondary winding of coil 40 for the stop pulse, comprise a pulse-shaping or filter element which tends to eliminate the low frequency components of these pulses and cause the pulses transmitted over the line to the central office to have a wave form approximating a single cycle of a sine wave.

During the next half cycle the reed contacts of relay 102 will close and cause the contacts of relay 101 to open. Closure of the contacts of relay 102 and the opening of the contacts of relay 101 occur very near the beginning of the half cycle. Consequently when the start pulse is generated by coil 40 it is transmitted over a circuit extending from conductor 74, the right-hand operated contacts 24, the left-hand break contacts 23, through the secondary winding of coil 54, the selector disc brush 12 which is assumed to be positioned in contact with No. 4 segment, the left-hand closed reed contacts of relay 102 to common conductor 39 and then through capacitor 72, inductor 27, capacitor 37 and through the right-hand contacts of contacts 23 and the left-hand operated set of contacts of contacts 24 to the conductor 73, extending to the central office.

A short time later the stop or digit pulse is generated in coil 54 which is likewise transmitted through the same circuit to conductors 73 and 74 extending to the central office. It is to be noted that the pair of pulses transmitted during the time the contacts of relay 101 are closed has one given polarity while the pair of pulses transmitted during the time the contacts of relay 102 are closed has the opposite polarity. The reversal of polarity of the successive pairs of pulses is illustrated in Figs. 12, 12A, 12B, 12C, 12D, and 12E, in which the successive pulses transmitted during successive half cycles are shown to be of opposite polarity.

If the selector switch 130 is set to transmit a number assumed to be CH3–1074 during the second half cycle after the blank interval, pulses will be transmitted from coils 40 and 54 designating G, H or I which we have assumed to be H; during the third half cycle pulses will be transmitted from coils 40 and 53; and during the fourth half cycle pulses will be transmitted by coils 40 and 51 will be transmitted through the contacts of relay 104. Thus during each half cycle following the blank interval a pair of pulses is transmitted under control of one of the brush arms 11 through 18, inclusive, as positioned by the selector discs designating the number of the called subscriber's station. Consequently, during each half cycle a pair of pulses is transmitted designating each one of the digits or symbols of the designation.

Each pair of pulses is transmitted during the time successive ones of the distributor relays 101 through 108 are operated. During the ninth half cycle and the succeeding three additional half cycles the relays 109 through 112 operate and transmit four additional pairs of pulses. These pulses are transmitted to identify the calling subscriber's station. As shown in Fig. 1 the left-hand reed contacts of these relays are connected to output windings of coils 57, 52, 53 and 55, thus indicating that the last four or any other specified group of digits of the calling subscriber's designation comprise the number 7235. Consequently this information is also available to the equipment at the central office for switching purposes as well as charging purposes if and when it is desired. Thus during the ninth half cycle the pair of pulses identifies the numeral 7 while the pair during the tenth half cycle identifies the numeral 2, etc.

At the end of the twelfth half cycle and at the beginning of the thirteenth half cycle relay 113 will again be operated and effectively short-circuit the line conductors 73 and 74 to the pulses so that no pulses will be transmitted during this half cycle. During the fourteenth half cycle relay 114 likewise operates and causes relay 113 to release. Relay 114 as described above also prevents transmission of any pulses to the central office. These two intervals during which no pulses are transmitted comprise a blank interval as described above to indicate that a complete designation or calling code has been transmitted and that a succeeding one will start following this blank interval. Thereafter the above cycle of operation of the calling equipment at the subscriber's station is repeated until the circuits at the central office function to change the connections of the subscriber's station.

The equipment at the central office in responding to one or more complete sets of signals or portions thereof will establish switching paths through the switches from the calling subscriber's line towards the called subscriber's line.

When the connection has been extended to the called subscriber's line the central office equipment is arranged to interrupt the alternating current applied between the line conductors 73 and 74 and to apply a direct-current voltage of the opposite polarity.

The details of the operation of the central office equipment in response to the calling signals transmitted from the subscriber's station and also the details of the arrangement for interrupting the application of the alternating current to the line conductors 73 and 74 at the central office and the application of a direct-current voltage is described in detail in the above-identified application of Malthaner and Vaughan.

Interruption of the alternating current stops the operation of the impulse coils 40 and 50 through 59 and also stops the operation of the distributor relays 101 through 114.

The application of the direct-current voltage between conductors 73 and 74 in the reverse direction causes the armature 25 of the magnetic relay or holding device 47 to operate to its right-hand position and thus permit contacts 23 to be operated. At this time both contacts 23 and 24 are operated and thus as described above the transmitter and receiver of the handset 21 are connected to the windings 32 and 33 of the induction coil and to the line conductors 73 and 74 extending to the central office. At this time the impulse coils as well as the distributor relays and the selector switch 130 are disconnected from the line so that they do not in any way interfere with the transmission and reception of the voice currents. Thereafter the circuits at the subscriber's station remain in the position described so long as communication takes place between the subscribers and so long as the handset 21 is removed from its supporting yoke or cradle and pins 22 are elevated.

Upon the completion of the call the handset 21 will be placed upon its supports and the pins 22 depressed, whereupon both sets of contacts 23 and 24 are actuated to the positions shown in the drawing. Likewise the armature 25 of the magnetic holding device 47 is moved to its left-hand position as shown in the drawing, at which time the circuits to the subscriber's station are returned to their normal or idle condition ready to respond to a call from the central office or to be utilized in making a call to another subscriber in the manner described above.

It is to be understood that the above-described arrangements are illustrative of an application of the principles of this invention. Numerous other arrangements and modifications may be devised by those skilled in the art without departing from the spirit and scope of the invention.

What is claimed is:

1. A subset comprising terminals for connecting said subset to a subscriber's line; voice current transmitting and receiving equipment; closed metallic loop call signal generating equipment comprising a plurality of impulse coils having primary and secondary windings for generating calling pulses, and means for selectively interconnecting said secondary windings with said terminals comprising a manually operable selector switch and a plurality of relays; and switching equipment for selectively connecting said signal generating equipment across said terminals, the selective connection of said signal generating equipment connecting said primary windings of said impulse coils across said terminals.

2. A closed metallic loop subset comprising terminals for connecting said subset to a subscriber's line; voice current transmitting and receiving equipment; call signal generating equipment having input and output devices; said input devices being looped across said terminals; a magnetic device having a high alternating-current impedance control winding; a first set of manually controllable switching contacts, the actuation of said first set of contacts connecting said input and output devices of said calling equipment in parallel with the winding of said magnetic device across said terminals; and a second set of switching contacts jointly controlled mechanically at said subset and magnetically by current applied to said terminals and to said magnetic device, the actuation of said second set of contacts disconnecting said calling equipment and said control winding from said terminals and connecting said voice current equipment across said terminals.

3. In a subset, closed metallic loop signal generating equipment comprising a plurality of impulse coils having primary and secondary windings; terminals connected to a subscriber's line; means for selectively interconnecting said secondary windings with said terminals comprising a manually operable selector switch and a plurality of relays, said primary windings being connected in series across said terminals to maintain the wave shape of an applied current flowing therein; and a filter network connecting said primary windings to said terminals for allowing only relatively low frequency currents to flow therethrough to said primary windings for generating pulses in said secondary windings, said filter network being also connected to said secondary windings allowing only relatively high frequency currents to flow therethrough from said secondary windings.

4. A subset comprising terminals connected to a subscriber's line; voice current transmitting and receiving equipment; closed metallic loop call signal generating equipment comprising a plurality of impulse coils having primary and secondary windings for generating calling pulses; means for selectively interconnecting said secondary windings with said terminals comprising a manually operable selector switch and a plurality of relays; a magnetic device having a control winding; a first set of switching contacts mechanically controlled at said subset, the actuation of said first set of contacts connecting said primary windings in parallel with the winding of said magnetic device across said terminals; a second set of switching contacts jointly controlled mechanically at said subscriber subset and magnetically by current applied through said terminals to said magnetic device, the actuation of said second set of contacts disconnecting said calling equipment and said control winding from said terminals and connecting said voice current equipment across said terminals.

5. A subset comprising terminals for connection to a subscriber's line; voice current transmitting and receiving equipment; closed metallic loop call signal generating equipment comprising a plurality of impulse coils having primary and secondary windings for generating calling pulses; means for selectively interconnecting said secondary windings with said terminals comprising a manually operable selector switch and a plurality of relays; switching equipment for selectively connecting said signal generating equipment across said terminals; the selective connection of said signal generating equipment essentially connecting said primary windings and selected ones of said secondary windings across said terminals at any one time; and a filter network connected to said primary, to secondary windings and to said terminals upon the connection of said signal generating equipment by said switching equipment to said terminals to allow only relatively low frequency currents thereto through to said primary windings and only relatively high frequency currents therethrough from said secondary windings.

6. A closed metallic loop subset comprising terminals connected to a subscriber's line; voice current transmitting and receiving equipment; call signal generating equipment; a magnetic device having a control winding; a first set of switching contacts mechanically controlled by the subscriber; a second set of switching contacts jointly controlled mechanically at said subset and magnetically by alternating current applied through said control winding over said terminals, said control winding being further rendered receptive to a direct current upon the actuation of said first set of switching contacts to maintain said second set of switching contacts unactuated until the completion of the operation of said signal generating equipment, the actuation of said second set of switching contacts disconnecting said calling equipment and the winding of said magnetic device from said terminals and connecting said voice current equipment across said terminals.

7. A subset comprising terminals for connection to a subscriber's line; voice current transmitting and receiving equipment; closed metallic loop call signal generating equipment comprising a plurality of impulse coils having primary and secondary windings for generating calling pulses; means for selectively interconnecting said secondary windings with said terminals comprising a manually operable selector switch and a plurality of relays; a magnetic device having a control winding; a first set of switching contacts mechanically controlled by the subscriber, the actuation of said first set of switching contacts connecting said primary windings and the secondary winding of one of said impulse coils across said terminals at a given time; a filter network connecting said primary and said secondary windings to said first set of switching contacts for allowing only relatively low frequency currents therethrough to said primary windings and only relatively high frequency currents therethrough from said secondary windings; a second set of switching contacts jointly controlled mechanically at said subset and magnetically by current applied over said terminals through the control winding of said magnetic device, the control winding of said magnetic device being further rendered receptive to a direct current applied over said terminals upon the actuation of said first set of switching contacts to maintain said second set of switching contacts unactuated until the completion of the operation of said signal generating equipment, the actuation of said second set of switching contacts disconnecting said calling equipment and said winding of said magnetic device from said terminals and connecting said voice current equipment across said terminals.

8. A subscriber set comprising terminals connected to a subscriber's line; a first set of switching contacts mechanically controlled by the subscriber; a supervisory circuit means comprising a control winding; a power current circuit means comprising impulse coil primary windings; a signal current circuit means; the actuation of said first set of contacts connecting said supervisory circuit means, said power current circuit means and said signal current circuit means across said terminals; a second set of switching contacts jointly controlled mechanically at said subscriber set and magnetically by current applied to said control winding and to said supervisory circuit means over said terminals, the actuation of said second set of contacts disconnecting said signal current means circuit and said power current circuit means from said terminals and maintaining the connection of said supervisory circuit means to said terminals.

9. In combination a subscriber's line; a supervisory direct current circuit means; a signal current circuit means; a power current circuit means; a talking current circuit means; a first set of switching contacts mechanically controlled by the subscriber, the actuation of said first set of contacts connecting said supervisory direct current circuit means, said signal current circuit means and said power current circuit means across said subscriber's line; and a second set of switching contacts jointly controlled mechanically at said subscriber subset and by said supervisory direct current circuit when rendered operative by direct current applied thereto over said subscriber's line, the actuation of said second set of contacts disconnecting said signal current circuit means and said power current circuit means from said subscriber's line and connecting said talking current circuit means to said subscriber's line; said operated supervisory direct current circuit being connected to said line by said first set of contacts and maintaining supervision throughout the making and duration of the call.

No references cited.